9876X
H. G. Guyon,
Cotton Press.
Patented July 2, 1836.
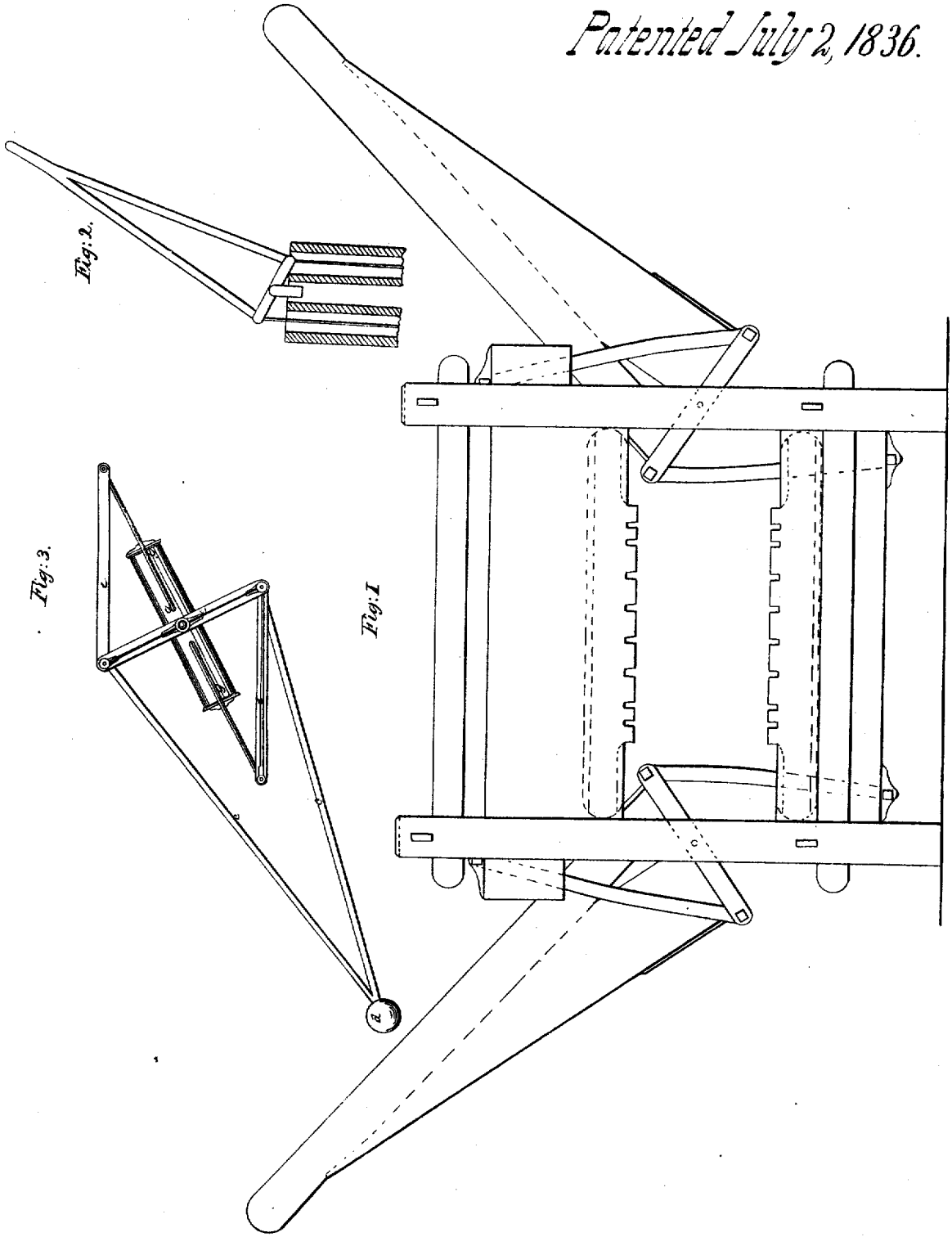
AM. PHOTO-LIT'HO. CO. N.Y. (OSBORNE'S PROCESS)

9876x  July 2, 1836

* Henry G. Guyon : New York City

Letters Patent

The Schedule referred to in these Letters Patent and making part of the
same containing a description in the words of the said Henry G. Guyon
himself of his improvement in the compound Lever for pressing and
raising substances.

To all whom it may concern Be it known that I Henry G. Guyon of the Ci
ty and State of New York, have invented a new and useful improve
ment in the mode of applying the compound lever power called "the Com
pound Balance Lever Press and Lifter" and may be used either
jointly or separately. The following is a description of the construction
and operation of said machine as invented by me. A bottom bed piece
or frame of suitable size with one, two, three, four, five, six, seven
eight or more posts or standards of suitable size & length framed in
an upright horizontal or angling position & framed or joined together in
such manner as will be most conducive to the strength that circum
stances may require said posts or standards to be placed at such distances
from each other as is most convenient to perform the work. it is intended
to be with a sufficient clamp or frame at each end of said posts
or standards to keep the frame together in its proper place. part of said
posts may be extended beyond the others for the purpose of attaching a
pulley to said posts or otherwise to work the levers or levers together with
one two or more platens followers beams lifters with two or four
cross beams playing or moving up and down or otherwise between
through or around said posts standards or frames as may seem best
at one or both ends or sides of said frame is placed one or more then metal
shaft or axle which may be square round, or at angles or otherwise with
journals at each end and in the centre or elsewhere if it is found ne-
cessary from said shaft or axle projects as many arms wings or flan
ges as may be necessary, from one two, three or more sides or parts of
suitable length, breadth & thickness standing out from the shaft or

[illegible] restored 14 December 1842.]

98 76X July 2, 1836 axle from one two three or more sides or parts parallel or from other sides
or [illegible] at right or oblique angles from the tumbler shaft or axle. the
number may be varied to suit circumstances. from two upwards to
any number required. or may be constructed. with a cylinder on said
shaft or axel with holes or mortices similar to the head of a capstan
of a Ship or vessel. to which bars or levers may be applied perpendicu-
larly or horizontally - which together with said shaft or axel arms,
wings or flanges or cylinder as described above constitutes the ful
crum or concentration of Power (commonly called the moving fulcrum
in consequence of its moving or vibrating on its own centre or journals.
The ends of said arms wings or flanges are so constructed as to rec[illegible]
the ends of what is termed the lever bar which are attached to
said fulcrum by means of bolts rivets or otherwise most convenient.
the other ends of said bars are attached to platten followers beares lift
ers or cross beams at each end by inserted blocks or otherwise most con
venient similar to the connection of said bar with the fulcrum other
from the connection between the fulcrum & the platten followers
beares lifters cross beams: said lever bars are formed or made each
of one bar or piece of iron or other metal either straight or curved
with holes in each end of proper size to receive the bolts or rivets [illegible]
from the connection between the fulcrum and the platten. followers
bearers or lifters or if necessary to the cross beams which may be attach
to said platten, following, beares or lifters. as is most convenient. or
if in case the cylinder be used on said shaft or axel instead of the
arms wings and flanges in that case it will be necessary to subs[illegible]
tute chains of iron or other metal for the lever bars to be connected si[illegible]
ilarly to said platten followers beares lifters or cross beams and be attac[illegible]
ed to and wound around the tumbler shaft or axel in order to redu[illegible]
the space between the platten followers beares lifters or cross beams.
In case the cylinder is used bars of wood or iron may be used sim[illegible]
to bars used in a capstan and [illegible] as a lever. but, in case the arm[illegible]
wings or flanges are used on said shaft or axel they will be attac[illegible]
ed to two or more levers by means of iron straps. Bars and bolts 9876x July 2, 1836 or otherwise to said levers by which means they are made to act upon
the fulcrum (these levers are called the acting levers) in consequence
of its performing or acting on the fulcrum the greatest action in com-
pressing or lifting or both jointly together as circumstances may
require by means of the connection between the fulcrum by the lever
bars or chains being connected with the platten followers, beams
lifters or cross beams. or the end of the [illegible] shaft or axel
may be of sufficient length to pass through the [illegible] with a eye
inder as described above on one end of said shaft or axel in-
stead of the centre and be worked by bars above. the lever or levers
when placed perpendicular and attached to the fulcrum will
bring the arms wings or flanges to a horizontal position (or a little
angling) then by drawing the levers down to a horizontal position
by hand with a wheel and windlass or by the action of horse water or
steam power or otherwise will cause the arms wings or flanges to
change to a perpendicular position acting on its centre consequent
by pressing and lifting at the same time and reducing the space between
the plattens &c. The length of the fulcrum at each motion of the lever
from a perpendicular to a horizontal position & vice versa. Said pres-
ses and lifters may be constructed of wood and iron or of all iron
or other metal and are intended for all the purposes requiring
a press or lifter or both jointly in every variety of shapes and forms
on the above principle but more particularly for pressing and compressing
cotton Moss. wool. Hay. Hemp tobacco, flour. Brick. extracting
oils and juices of every description Metals punching and cutting and
[illegible] all kinds of metals printing in every variety, paper in every state
Baling and finishing dry Goods of every description lifting & rais-
ing water by pumps or otherwise lifting or raising vessels of every cla-
[illegible] and above the water and propelling them through it with
velocity — What I claim as my invention & which I desire
to secure by Letters Patent consists in the before described mode of
applying the lever power and constructing the fulcrum with arms
wings or flanges projecting from two three or more sides or parts of 9876x July 2, 1836 the shaft is used as above described and the mode of using the platform &c. pressing and lifting at both ends at the same time, and by so lifting separately, for the above named purposes Witnesses
Wm P Elliott
Ch. Goulding Henry G Guyon

[12 3/4 words]

Drawing